United States Patent
Nam et al.

(10) Patent No.: US 12,488,945 B2
(45) Date of Patent: Dec. 2, 2025

(54) MULTILAYER ELECTRONIC COMPONENT

(71) Applicant: SAMSUNG ELECTRO-MECHANICS CO., LTD., Suwon-si (KR)

(72) Inventors: Chan Hee Nam, Suwon-si (KR); Oh Hun Gwon, Suwon-si (KR); Jae Hyun Park, Suwon-si (KR); Kwan Yeol Paek, Suwon-si (KR); Chang Geon Lee, Suwon-si (KR); Hae Suk Chung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 169 days.

(21) Appl. No.: 18/390,621

(22) Filed: Dec. 20, 2023

(65) Prior Publication Data
US 2024/0212941 A1  Jun. 27, 2024

(30) Foreign Application Priority Data
Dec. 26, 2022  (KR) .......................... 10-2022-0184401

(51) Int. Cl.
*H01G 4/30* (2006.01)
*H01G 4/012* (2006.01)
(Continued)

(52) U.S. Cl.
CPC .............. *H01G 4/30* (2013.01); *H01G 4/012* (2013.01); *H01G 4/1227* (2013.01); *H01G 4/2325* (2013.01)

(58) Field of Classification Search
CPC ........ H01G 4/30; H01G 4/012; H01G 4/1227; H01G 4/2325
See application file for complete search history.

(56) References Cited

U.S. PATENT DOCUMENTS

| | | | |
|---|---|---|---|
| 6,614,644 B2* | 9/2003 | Chazono | H01G 4/1209 |
| | | | 361/312 |
| 2012/0050941 A1* | 3/2012 | Murakawa | C04B 35/4682 |
| | | | 361/321.1 |

(Continued)

FOREIGN PATENT DOCUMENTS

| | | |
|---|---|---|
| JP | 2013-209239 A | 10/2013 |
| JP | 2018-531857 A | 11/2018 |

(Continued)

OTHER PUBLICATIONS

O. Emelyanov, et al., "Ferroelectric capacitors in pulsed modes: experimental study and analytical calculations", IEEE, 2016, 4 pages.

(Continued)

*Primary Examiner* — Michael P Mcfadden
(74) *Attorney, Agent, or Firm* — MORGAN, LEWIS & BOCKIUS LLP

(57) ABSTRACT

A multilayer electronic component includes a body including a dielectric layer and internal electrodes; and external electrodes disposed on the body, wherein the dielectric layer includes a plurality of dielectric grains having a perovskite-based composition represented by $ABO_3$, the A includes a first element including at least one of Bi, Na, K, Sr, and Ca, and the B includes a second element including Ti, wherein at least one of the plurality of dielectric grains has a core-shell structure, and a content of the first element included in the core portion is twice or more than a content of the first element included in the shell portion, and wherein the core portion includes a first core portion on an internal side and a second core portion covering at least a portion of the first core portion, and the second core portion includes Zr.

23 Claims, 6 Drawing Sheets

(51) Int. Cl.
    *H01G 4/12*    (2006.01)
    *H01G 4/232*   (2006.01)

(56) References Cited

U.S. PATENT DOCUMENTS

| | | | |
|---|---|---|---|
| 2014/0098455 A1 | 4/2014 | Kang et al. | |
| 2017/0152187 A1* | 6/2017 | Nagaoka | C01G 23/006 |
| 2017/0271082 A1* | 9/2017 | Yoon | H01G 4/228 |
| 2018/0211777 A1 | 7/2018 | Tauchi et al. | |
| 2019/0066920 A1* | 2/2019 | Kim | C04B 35/4682 |
| 2021/0210288 A1 | 7/2021 | Kang et al. | |
| 2021/0383973 A1* | 12/2021 | Matsumoto | H01G 4/1227 |
| 2022/0130608 A1 | 4/2022 | Mizuno et al. | |
| 2022/0199326 A1* | 6/2022 | Kim | C04B 35/62821 |
| 2022/0415576 A1* | 12/2022 | Tsushima | H01G 4/012 |
| 2023/0250024 A1* | 8/2023 | Fuse | B32B 18/00<br>501/137 |
| 2023/0274885 A1* | 8/2023 | Tamura | H01G 4/008 |

FOREIGN PATENT DOCUMENTS

| | | |
|---|---|---|
| KR | 10-2019-0019975 A | 2/2019 |
| KR | 10-2022-0088099 A | 6/2022 |

OTHER PUBLICATIONS

G. Lee, et al., "Enhanced piezoelectric properties of (Bi,Na)TiO3-(Bi,K)TiO3 ceramics prepared by two-step sintering process", Int J Appl Ceram Technol., 2018, pp. 531-537.

Extended European Search Report issued in corresponding European Patent Application No. 23216218.0 dated Jul. 4, 2024.

* cited by examiner

MULTILAYER ELECTRONIC COMPONENT

CROSS-REFERENCE TO RELATED APPLICATION(S)

This application claims benefit of priority to Korean Patent Application No. 10-2022-0184401 filed on Dec. 26, 2022 in the Korean Intellectual Properties Office, the disclosure of which is incorporated herein by reference in its entirety.

TECHNICAL FIELD

The present disclosure relates to a multilayer electronic component.

BACKGROUND

A multilayer electronic component (MLCC), a multilayer electronic component, may be a chip condenser mounted on a printed circuit board of various types of electronic products such as imaging devices including a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and high-output, demand for miniaturization and high capacitance multilayer ceramic capacitors has been increased.

Meanwhile, when a high voltage is applied to a barium titanate ($BaTiO_3$)-based multilayer ceramic capacitor, dielectric properties may be significantly reduced due to DC-bias properties. To prevent deterioration of dielectric properties due to high voltage application, by dissolving and diffusing an element other than Ba or Ti into barium titanate and are substituting an elemental site of Ba or Ti, degradation of dielectric properties due to DC-bias properties may be prevented. However, as Ba or Ti elements are substituted, dielectric properties such as a high dielectric constant of existing $BaTiO_3$ may be deteriorated, such that it may be necessary to design the composition appropriately.

SUMMARY

An example embodiment of the present disclosure is to prevent deterioration of dielectric properties of a multilayer electronic component even in a high-temperature/high-pressure environment and to improve reliability.

According to an example embodiment of the present disclosure, a multilayer electronic component includes a body including a dielectric layer and an internal electrode; and external electrodes disposed on the body. The dielectric layer includes a plurality of dielectric grains having a perovskite-based composition represented by $ABO_3$, the A includes a first element including at least one of Bi, Na, K, Sr, and Ca, and the B includes a second element including Ti. At least one of the plurality of dielectric grains has a core-shell structure including a core portion on an internal side and a shell portion covering at least a portion of the core portion, and a content of the first element included in the core portion is twice or more than a content of the first element included in the shell portion. The core portion includes a first core portion on an internal side and a second core portion covering at least a portion of the first core portion, and the second core portion includes Zr.

According to an example embodiment of the present disclosure, a multilayer electronic component includes a body including a dielectric layer and an internal electrode; and an external electrode disposed on the body to connect to the internal electrode. The dielectric layer includes a dielectric grain having a core-shell structure including a core portion and a shell portion covering at least a portion of the core portion. The core portion of the dielectric grain includes Ti and an element including at least one of Bi, Na, K, Sr, and Ca. The shell portion of the dielectric grain includes a rare earth element. On a linear path crossing the dielectric grain, a content of Zr has a peak in a region where a content of Ti or the element is more than the rare earth element.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
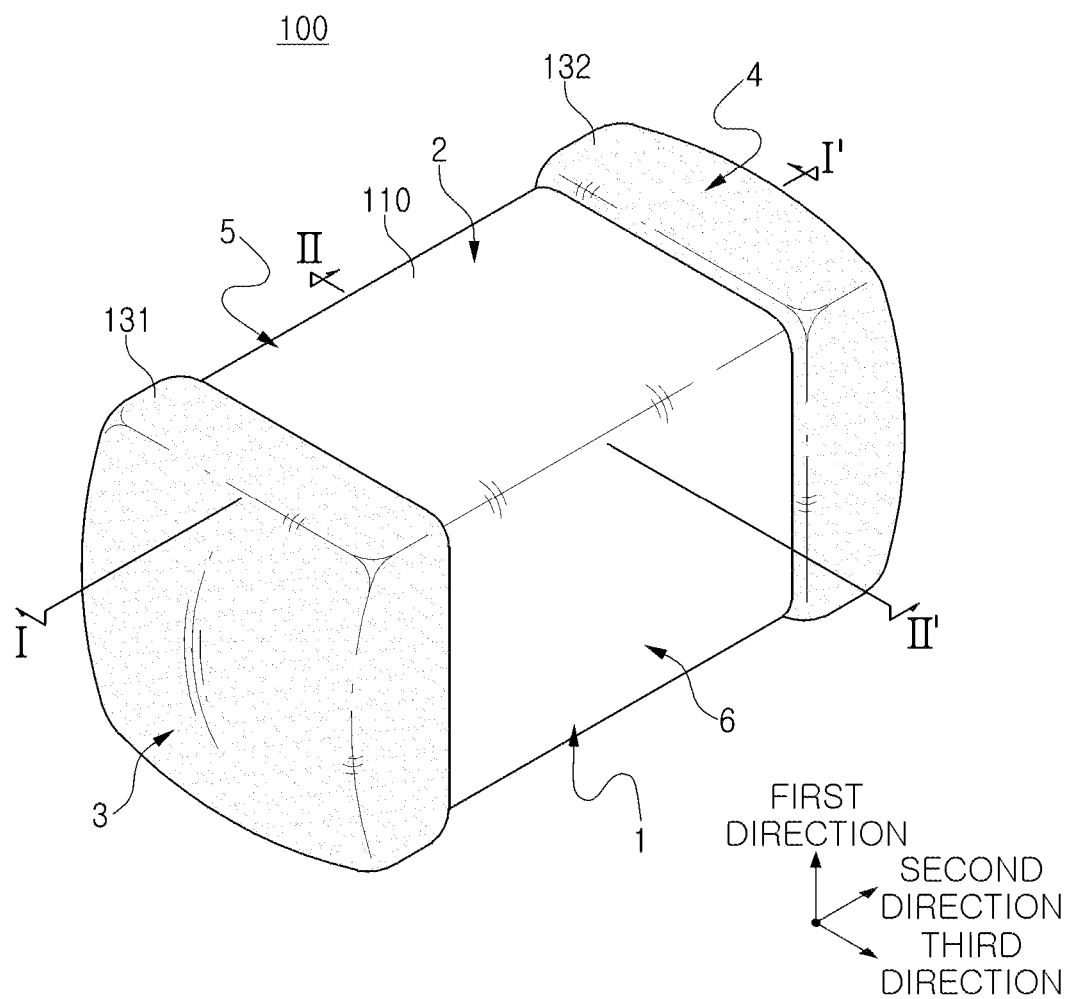
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
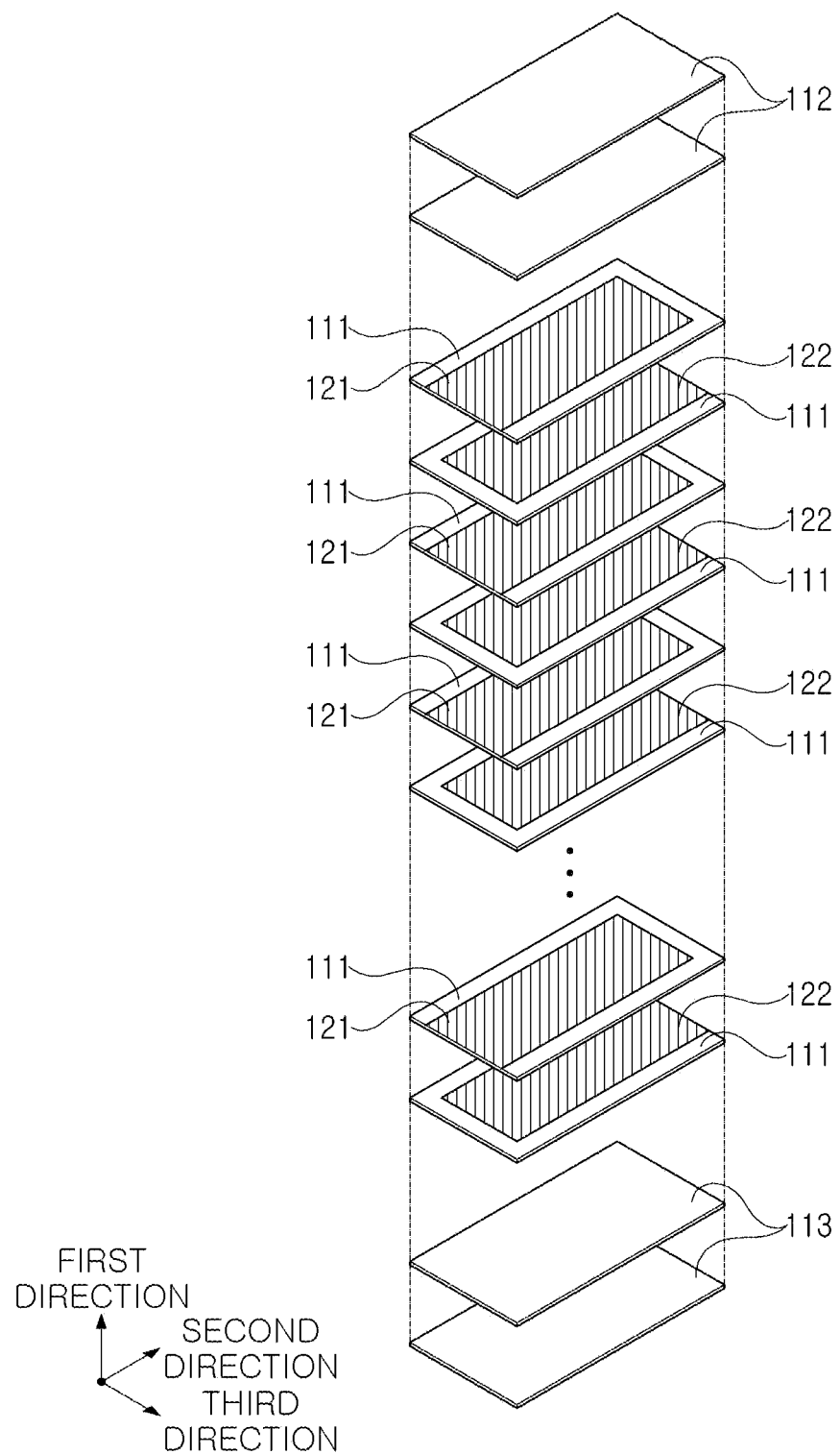
FIG. 2 is an exploded perspective diagram illustrating a laminate structure of internal electrodes according to an example embodiment of the present disclosure.

FIG. 2 is an exploded perspective diagram illustrating a laminate structure of internal electrodes according to an example embodiment.

Figure 3:
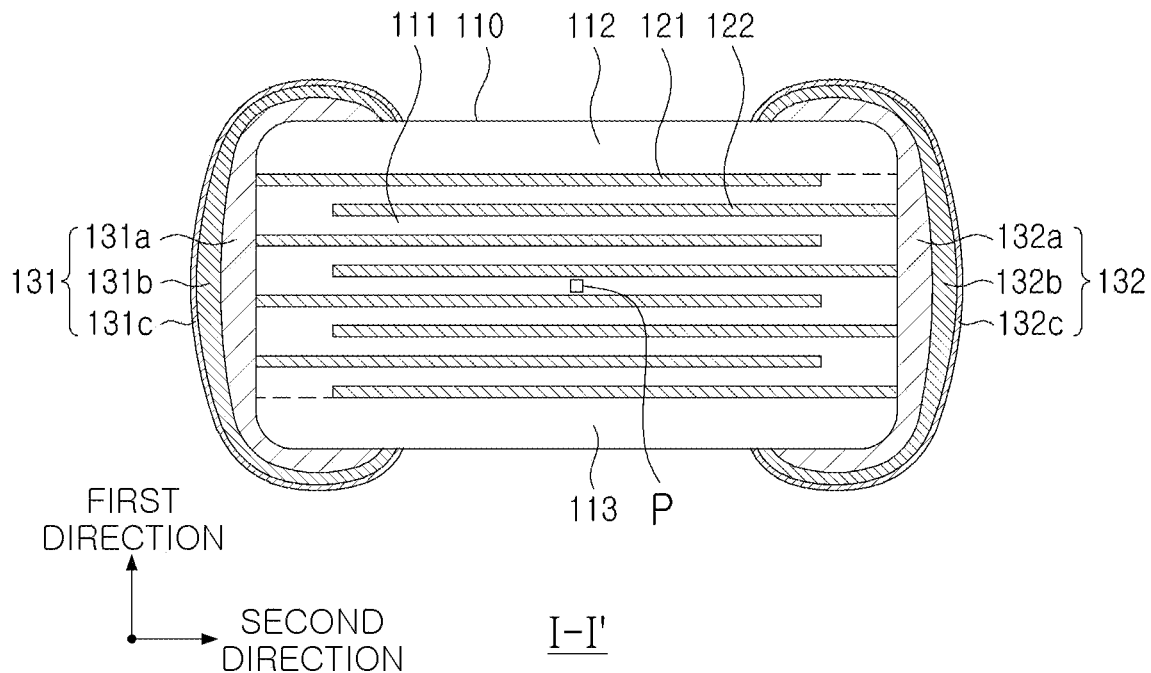
FIG. 3 is a cross-sectional diagram taken along line I-I' in FIG. 1.

FIG. 3 is a cross-sectional diagram taken along line I-I' in FIG. 1.

Figure 4:
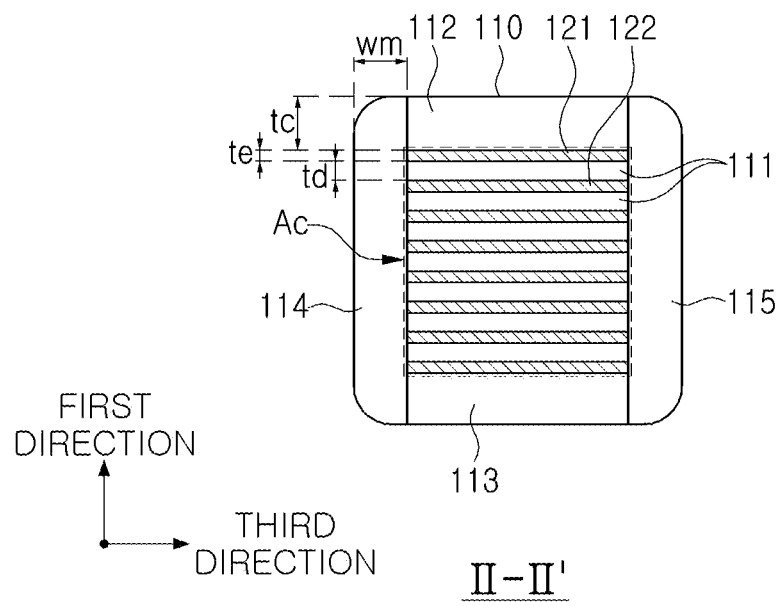
FIG. 4 is a cross-sectional diagram taken along line II-II' in FIG. 1.

FIG. 4 is a cross-sectional diagram taken along line II-II' in FIG. 1.

Figure 5:
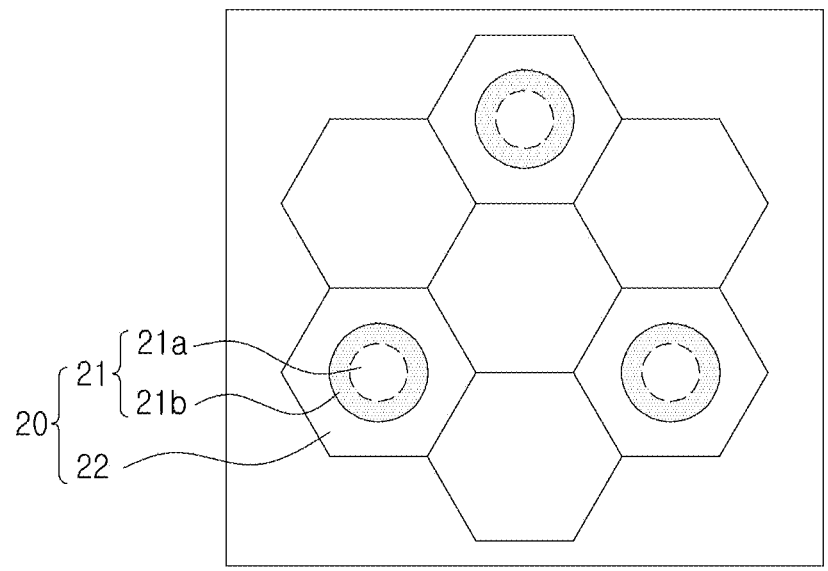
FIG. 5 is an enlarged diagram illustrating region P in FIG. 3.

FIG. 5 is an enlarged diagram illustrating region P in FIG. 3.

Figure 6:
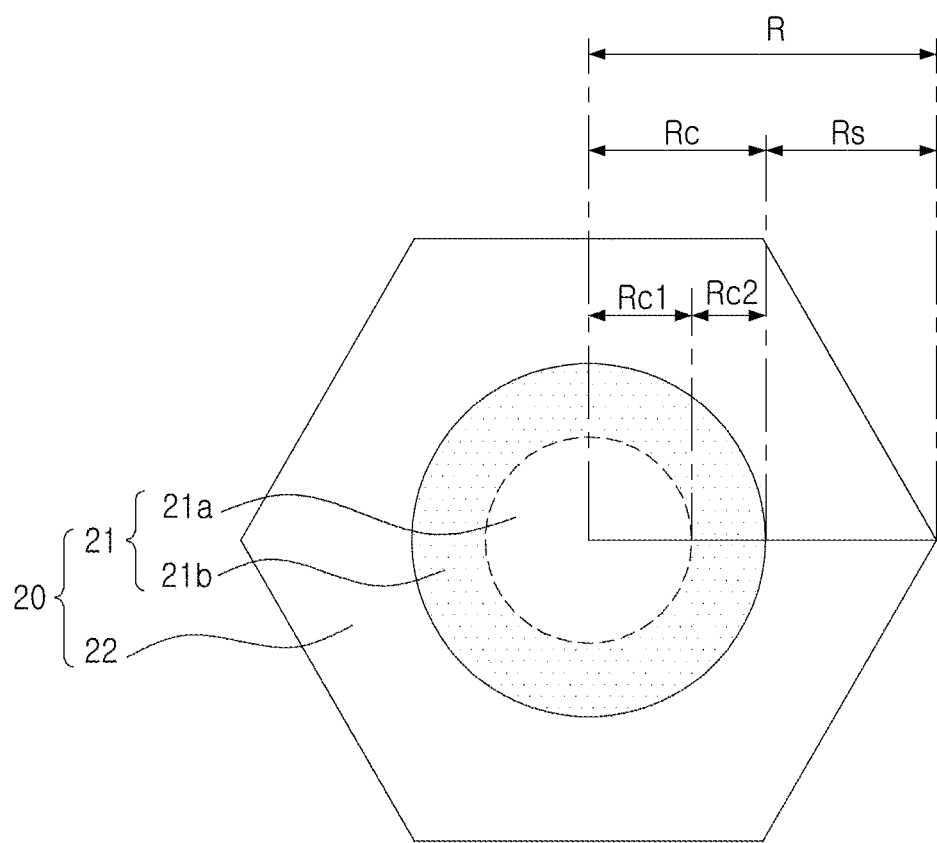
FIG. 6 is a diagram illustrating a dielectric grain having a core-shell structure according to an example embodiment of the present disclosure.

FIG. 6 is a diagram illustrating a dielectric grain having a core-shell structure according to an example embodiment.

Figure 7:
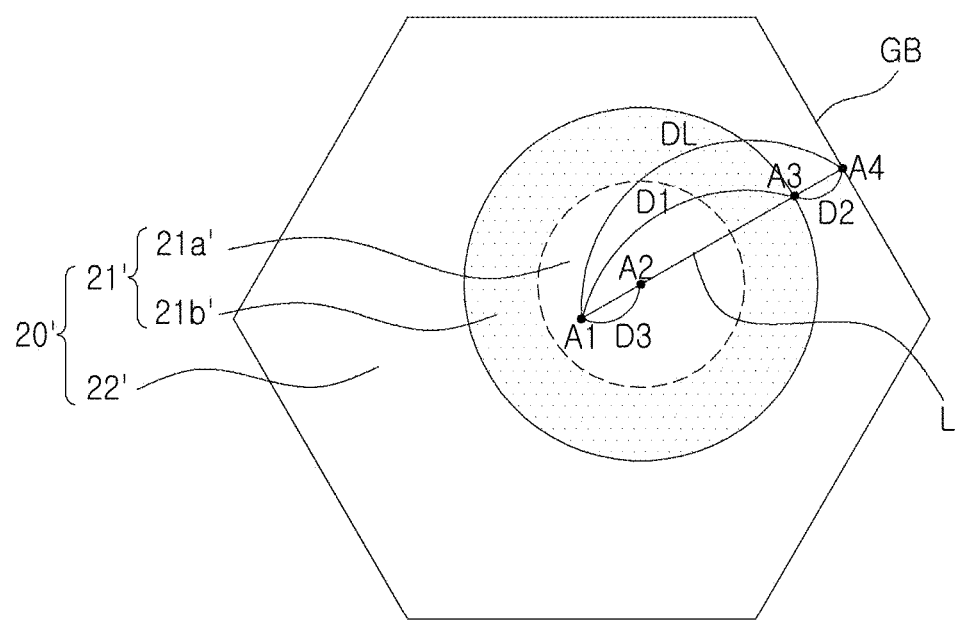
FIG. 7 is a diagram illustrating a dielectric grain having a core-shell structure according to an example embodiment of the present disclosure.

FIG. 7 is a diagram illustrating a dielectric grain having a core-shell structure according to an example embodiment.

Figure 8:
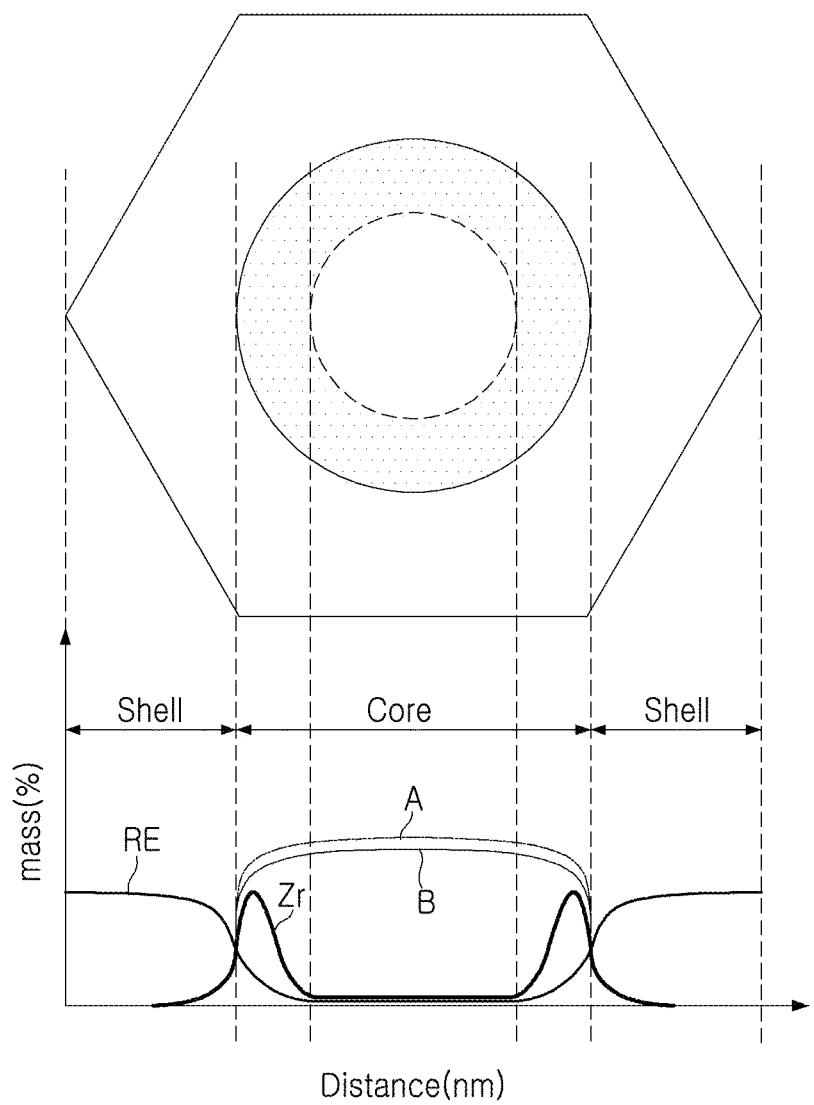
FIG. 8 is a diagram illustrating an element content (mass percentage) for each region of a dielectric grain having a core-shell structure according to an example embodiment of the present disclosure.

FIG. 8 is a diagram illustrating an element content (mass percentage) for each region of a dielectric grain having a core-shell structure according to an example embodiment.

Hereinafter, a multilayer electronic component according to an example embodiment will be described in greater detail with reference to FIGS. 1 to 8. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body 110 including a dielectric layer 111 and internal electrodes 121 and 122; and external electrodes 131 and 132 disposed on the body 110. The dielectric layer 111 may include a plurality of dielectric grains having a perovskite-based composition represented by $ABO_3$, the A may include a first element including at least one of Bi, Na, K, Sr, and Ca, the B may include a second element including Ti, at least one of the plurality of dielectric grains may include a core-shell structure 20 including a core portion 21 on an internal side and a shell portion 22 covering at least a portion of the core portion 21, the content of the first element included in the core portion 21 may be twice or more than the content of the first element included in the shell portion 22, the core portion 21 may include a first core portion 21a on an internal side and a second core portion 21b covering at least a portion of the first core portion 21a, and the second core portion 21b may include Zr.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a sintering process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a sintered state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

Meanwhile, when a high voltage is applied to a barium titanate ($BaTiO_3$)-based multilayer ceramic capacitor, dielectric properties may be significantly reduced due to DC-bias properties. To prevent dielectric properties deterioration due to high voltage application, by dissolving and diffusing an element other than Ba or Ti into barium titanate and by substituting an elemental site of Ba or Ti, degradation of dielectric properties due to DC-bias properties may be prevented. However, as Ba or Ti elements are substituted, dielectric properties such as a high dielectric constant of existing $BaTiO_3$ may be deteriorated, such that it may be necessary to appropriately design the composition.

In an example embodiment, the A-site in the $ABO_3$ perovskite-based composition may include a first element including at least one of Bi, Na, K, Sr, and Ca. Also, the B-site may include a second element including Ti, but an example embodiment thereof is not limited thereto, and may include at least one element of Hf and Zr.

The A-site of the $ABO_3$ perovskite-based composition may include a first element including at least one of Bi, Na, K, Sr, and Ca, and the B-site may include a second element including at least one of Ti, Hf, and Zr, such that degradation of dielectric properties due to DC-bias properties may be effectively prevented even under high-temperature/high-voltage conditions, thereby manufacturing a multilayer electronic component having improved reliability.

In this case, the content of the first element may be 80 mol % or more based on 100 mol % of the A-site element, and the content of the second element may be 80 mol % or more based on 100 mol % of the B-site element.

By including 80 mol % or more of the first element based on 100 mol % of the A element, Dc-bias properties may be improved, and by including 80 mol % or more of the second element based on 100 mol % of the B element, the effect of improvement in reliability may be excellent.

The dielectric layer 111 may include a plurality of dielectric grains, and at least one of the plurality of dielectric grains may have a core-shell structure. In other words, dielectric grains 20 having a core-shell structure and dielectric grains not having a core-shell structure may be included.

The core-shell structure may refer to a structure including a core portion 21 on an internal side and a shell portion 22 covering at least a portion of the core portion 21.

In this case, the content of the first element included in the core portion 21 may be twice or more than the content of the first element included in the shell portion 22.

Dielectric properties and Dc-bias properties may be further improved by controlling the content of the first element included in the core portion 21 to be twice or more than the content of the first element included in the shell portion 22.

Here, the content of the first element may be obtained by measuring the element content with a line profile of a linear line passing through the center of dielectric grain, but an example embodiment thereof is not limited thereto.

For example, the observation may be performed using a scanning electron microscope (SEM), a transmission electron microscope (TEM), or a scanning transmission electron microscope (STEM) based on cross-sections of the body 110 in the first and second directions, and by mapping the element to be measured with energy dispersive X-ray spectrometer (EDS).

The observation area of the measuring equipment described in the example embodiment is not limited to any particular example, and an area of 2 μm×2 μm may be observed at a magnification of 10,000 times or more.

For another example, in dielectric grain 20 of the core-shell structure, by arbitrarily determining a measurement point for each of the core portion 21 and the shell portion 22 and performing point analysis, the content rate for each element may be calculated at each measurement point. Also, by averaging the contents of elements included in each region, the content of elements included in the core portion 21 and the content of elements included in the shell portion 22 may be calculated.

As for the actual number of measurement points, an average value may be calculated by measuring 5 or more points on the core portion 21 and 10 or more points on the shell portion 22, and the first element content of the entirety of pixels may be measured by mapping the first element, and the content of the first element included in each region may be calculated from the first element content of the entirety of pixels.

In this case, the core portion 21 may include a first core portion 21a on the internal side and a second core portion 21b covering at least a portion of the first core portion 21a, and the second core portion 21b may include zirconium (Zr).

When the fraction of the shell portion 22 in the core-shell structure increases, the effect of improvement of the Dc-bias properties may decrease, but when the fraction of the shell portion 22 is determined to be low, it may be difficult to form a uniform and stable shell portion 22, such that it may be difficult to expect the effect of improvement in dielectric properties to be supplemented, particularly the effect of improvement in reliability.

Accordingly, by forming a partial zirconium (Zr) substitution layer on the core-shell interface, more specifically, on the surface of the core portion 21, insulation resistance may be increased, and the fraction of the shell portion 22 may be stably reduced and may be formed uniformly, such that dielectric properties may be supplemented while improving insulation resistance properties.

The method of forming the zirconium (Zr) substitution layer is not limited to any particular example, and by coating and pre-diffusing zirconium (Zr) on the $ABO_3$ base material powder before sintering, zirconium (Zr) may be diffused into the core portion 21, and a second core portion 21b including zirconium (Zr) in the dielectric grain 20 of the core-shell structure may be formed.

Diffusion of an additive element, for example, a rare earth element (RE) into the core portion 21 may be prevented by a zirconium (Zr) substitution layer, thereby preventing the deterioration of dielectric properties, the element may be coated with an additive in a uniform thickness while covering at least a portion of the zirconium (Zr) substitution layer. The coated additive element may be detected on the shell portion 22 after sintering.

The average content of zirconium (Zr) included in the dielectric grain 20 of the core-shell structure may be highest in the second core portion 21b.

The detection of zirconium (Zr) may be confirmed by the above-described element measurement method, and may be confirmed through, for example, element mapping, line profile, or detection at an arbitrary measurement point.

In the example embodiment, the average size of the microstructures included in the dielectric layer 111, such as the core portion 21, the shell portion 22, and dielectric grain may refer to a value obtained by measuring and averaging a minimum size of a linear line size and a maximum size of linear line passing through the central point of each component, but an example embodiment thereof is not limited thereto.

In an example embodiment, when ½ of the average size of the core portion 21 is defined as Rc and ½ of the average size of the shell portion 22 is defined as Rs, Rs≤Rc may be satisfied, and more preferably, 0<Rs≤Rc/2 may be satisfied.

That is, the average size of the core portion 21 may be larger than the average size of the shell portion 22, and the fraction of the core portion 21 may be larger in dielectric grain 20 of the core-shell structure.

To implement a multilayer electronic component having excellent dielectric properties and improved reliability, the properties may be implemented by increasing the fraction of the shell portion, but by forming the second core portion 21b, an effect of improving reliability may be obtained even though the fraction of the shell portion 22 is relatively small.

However, an example embodiment thereof is not limited thereto, and when ½ of the average size of the core portion 21 is defined as Rc and ½ of the average size of the shell portion 22 is defined as Rs, Rc≤Rs may be satisfied.

That is, the average size of the shell portion 22 may be larger than the average size of the core portion 21, and the fraction of the shell portion 22 may be larger in dielectric grain 20 of the core-shell structure.

By increasing the fraction of the shell portion 22, an effect of improving reliability may be obtained.

Also, in an example embodiment, the central point of dielectric grain 20 of the core-shell structure may be different from the central point of the core portion 21, more specifically, the central point of the core portion 21 may be adjacent to a grain boundary of the dielectric grain 20 of the core-shell structure. Here, the grain boundary may refer to a boundary between adjacent dielectric grains, and dielectric grain may be surrounded by a plurality of grain boundaries.

In other words, among the boundaries between the core portion 21 and the shell portion 22, a portion adjacent to the grain boundary may be present, and the shell portion 22 region between the core portion 21 and the grain boundary may be barely present.

This may be a result of not forming a uniform thickness of the additive on the surface of the dielectric particles before sintering or a result of not sufficiently forming the shell portion 22 region during the sintering process.

In the case of the general manufacturing method, in a structure in which the shell portion 22 region is barely present between the core portion 21 and the grain boundary, insulation resistance may not be sufficient and reliability may deteriorate.

However, in an example embodiment, even when there is almost no shell portion 22 region between the core portion 21 and the grain boundary, by the presence of the second core portion 21b, sufficient reliability may be ensured by zirconium (Zr) having high insulation resistance.

For example, referring to FIG. 7, which is an example embodiment, the linear line from the central point A1 of the dielectric grain 20' of the core-shell structure to the grain boundary A4 passing through the central point A2 of the core portion 21' may be defined as L. In this case, when the size of the linear line L, that is, the linear distance from the central point A1 of the dielectric grain 20' of the core-shell structure to the grain boundary A4 is defined as DL, the linear distance from the central point A1 of the dielectric grain 20' of the core-shell structure to the boundary point A3 of the core portion 21' and shell portion 22' is defined as D1, the linear distance from the boundary point A3 of the core portion 21' and the shell portion 22' to the grain boundary A4 is defined as D2, and the linear distance from the central point A1 of the dielectric grain 20' of the core-shell structure to the central point A2 of the core portion 21' is defined as D3, 0<D3 and D2<D1 may be satisfied.

Here, 0<D3 may indicate that the central point A1 of the core-shell dielectric grain 20' and the central point A2 of the core portion 21' may not coincide, and D2<D1 may indicate that the distance between the core portion 21' and the grain boundary GB may be relatively short, but an example embodiment thereof is not limited thereto. Also, A1, A2, and A3 may be disposed on the linear line L, D1, D2, and D3 may refer to a partial linear distance of the linear line L, and DL may refer to the entire linear distance of the linear line L.

In an example embodiment, when ½ of the average size of the first core portion 21a is defined as Rc1 and ½ of the average size of the second core portion 21b is defined as Rc2, Rc2<Rc1 may be satisfied.

That is, the average size of the first core portion 21a may be greater than the average size of the second core portion 21b, and in the core portion 21, the fraction of the first core portion 21a may be greater.

When the fraction of the first core portion 21a is greater than that of the second core portion 21b, that is, when Rc2<Rc1, dielectric properties may be excellent and the effect of improvement in reliability may be excellent.

When the fraction of the second core portion 21b increases, deterioration in dielectric properties may degrade.

Here, Rc2 may satisfy 5 nm or more and 100 nm or less. That is, ½ of the average size of the second core portion 21b may be greater than or equal to 5 nm and less than or equal to 100 nm, and by satisfying the above size, dielectric properties may be excellent and the effect of improvement in reliability may be excellent.

When Rc2 is less than 5 nm, it may be difficult to form a uniform and stable fraction of the shell portion 22, and Dc-bias properties or the effect of improvement in reliability may be deteriorated. When Rc2 is greater than 100 nm, sufficient dielectric properties may be difficult.

The formation amount of core-shell crystal grains 20 may be appropriately controlled by the composition of the dielectric composition, a manufacturing method, and sintering conditions. For example, a core-shell structure may be formed by controlling the content of additives in raw powder or by controlling a sintering atmosphere, and additionally, the size of dielectric grains may be controlled.

The dielectric grain 20 of the core-shell structure may include a rare earth element, and the average content of the rare earth element may be highest in the shell portion 22.

The content of the rare earth element may change rapidly at the boundary between the core portion 21 and the shell portion 22, and the content of the rare earth element may be measured by performing a line-profile or after measuring at a plurality of measurement points, the boundary point may be confirmed.

Here, the rare earth element RE may include at least one of Y, Dy, Tb, Ho, Er, Gd, Ce, Nd, Sm, Tm, La, Gd, and Yb, but an example embodiment thereof is not limited thereto, and any rare earth element able to be added to improve reliability may be used.

A method of detecting a rare earth element may be confirmed through the above-described element measurement methods.

The average size of dielectric grains included in the dielectric layer 111, for example, the dielectric grains 20 of the core-shell structure, is not limited to any particular example, but may satisfy 100 nm or more and 400 nm or less.

When the average size of dielectric grains is less than 100 nm, it may be difficult to implement sufficient dielectric properties, and when the average size of dielectric grains exceeds 400 nm, Dc-bias properties may be deteriorated.

The thickness td of the dielectric layer 111 may not be limited to any particular example.

However, to easily implement a reduced size and high capacitance of the multilayer electronic component 100, the thickness td of the dielectric layer 111 may be 3.0 μm or less. To easily obtain miniaturization and high capacitance of the multilayer electronic component, the thickness of the dielectric layer 111 may be 1.0 μm or less, preferably 0.6 μm or less, and more preferably 0.4 μm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized.

The internal electrodes 121 and 122 may be alternately laminated with the dielectric layer 111.

The internal electrodes 121 and 122 may include a first internal electrode 121 and a second internal electrode 122. The first and second internal electrodes 121 and 122 may be alternately disposed to face each other with the dielectric layer 111 included in the body 110 interposed therebetween, and may be exposed to (or be in contact with or extend from) the third and fourth surfaces 3 and 4 of the body 110, respectively.

More specifically, the first internal electrode 121 may be spaced apart from the fourth surface 4 and may be exposed through (or be in contact with or extend from) the third surface 3, and the second internal electrode 122 may be spaced apart from the third surface 3 and may be exposed through (or be in contact with or extend from) the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and sintering the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 1.0 μm or less, and to easily obtain miniaturization and high capacitance of the multilayer electronic component, the thickness of the internal electrodes 121 and 122 may be 0.6 μm or less, more preferably 0.4 μm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first direction using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized.

In an example embodiment, the thickness td of the dielectric layer 111 and the thickness te of the internal electrodes 121 and 122 may satisfy 2×te<td.

In other words, the thickness td of the dielectric layer 111 may be greater than twice the thickness te of the internal electrodes 121 and 122.

In general, a reliability problem caused by a decrease in a breakdown voltage (BDV) in a high voltage environment is a major issue in electronic components for high voltage electric vehicles.

Accordingly, to prevent a decrease in breakdown voltage under a high voltage environment, by increasing the thickness td of the dielectric layer 111 more than twice the thickness te of the internal electrodes 121 and 122, the thickness of the dielectric layer, which is the distance between internal electrodes, may be increased, and the breakdown voltage properties may be improved.

When the thickness td of the dielectric layer 111 is less than twice the thickness te of the internal electrodes 121 and 122, the thickness of the dielectric layer, which is the distance between the internal electrodes, may be thin, such that the breakdown voltage may decrease.

In a high-voltage electronic component, a thickness te of an internal electrode may be 1 μm or less, and a thickness td of a dielectric layer may be 3.0 μm or less, but an example embodiment thereof is not limited thereto.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portions 112 and 113 may not need to be limited to any particular example.

However, to easily obtain miniaturization and high capacitance of multilayer electronic components, the thickness tc of the cover portions 112 and 113 may be 100 μm or less, preferably 30 μm or less. More preferably, the thickness may be 20 μm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image.

The multilayer electronic component 100 may include side margin portions 114 and 115 disposed on both end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110.

As illustrated, the side margin portions 114 and 115 may refer to a region between both end-surfaces of the first and second internal electrodes 121 and 122 in the third direction and the boundary surface of the body 110 with respect to the cross-section of the body 110 in the first and third directions.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The side margin portions 114 and 115 may basically prevent damages to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

Meanwhile, the width wm of the first and second side margin portions 114 and 115 may not need to be limited to any particular example.

However, to easily obtain miniaturization and high capacitance of the multilayer electronic component 100, the width wm of the side margin portions 114 and 115 may be 100 μm or less, preferably 30 μm or less, and may be more preferably 20 μm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115, and the average size of the side margin portions 114 and 115 in the third direction.

The average size of the side margin portions 114 and 115 in the third direction may be measured by scanning a cross-section of the body 110 in the first and third directions using a scanning electron microscope (SEM) with a magnification of 10,000. More specifically, the average size may be an average value measured from the size in the third direction at 30 points spaced apart from each other by an equal distance in the first direction in the scanned image of one of the side margin portion.

In an example embodiment, the ceramic electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers 131a, 132a, 131b, and 132b disposed on the body 110 and plating layers 131c and 132c disposed on the electrode layers 131a, 132a, 131b, and 132b.

For a more specific example of the electrode layers 131a, 132a, 131b, and 132b, the electrode layers 131a, 132a, 131b, and 132b may be sintered electrodes including a first conductive metal and glass, or a second conductive metal and resin.

Also, the electrode layers 131a, 132a, 131b, and 132b may have a form in which a plastic electrode and a resin-based electrode are formed in order on the body.

Also, the electrode layers 131a, 132a, 131b, and 132b may be formed by transferring a sheet including a conductive metal onto a body or by transferring a sheet including a conductive metal onto a sintered electrode.

A material having excellent electrical conductivity may be used as the conductive metal included in the electrode layers 131a, 132a, 131b, and 132b. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto. The electrode layers 131a, 132a, 131b, and 132b may be formed by applying a conductive paste prepared by adding glass frit to the conductive metal powder and sintering the paste.

In an example embodiment, the electrode layers 131a, 132a, 131b, and 132b may have a two-layer structure including first electrode layers 131a and 132a and second electrode layers 131b and 132b, and accordingly, the external electrodes 131 and 132 may include first electrode layers 131a and 132a including conductive metal and glass, and second electrode layers 131b and 132b disposed on the first electrode layers 131a and 132a and including conductive metal and resin.

As the first electrode layers 131a and 132a include glass, the first electrode layers 131a and 132a may improve bonding with the body 110, and as the second electrode layers 131b and 132b include resin, the second electrode layers 131b and 132b may improve bending strength.

The conductive metal used in the first electrode layers 131a and 132a is not limited to any particular example as long as a material may be electrically connected to the internal electrodes 121 and 122 to form capacitance. For example, nickel (Ni), copper (Cu), palladium (Pd), silver (Ag), gold (Au), platinum (Pt), tin (Sn), tungsten (W), titanium (Ti) and alloys thereof may include one or more. The first electrode layers 131a and 132a may be formed by applying a conductive paste prepared by adding glass frit to the conductive metal powder and sintering the paste.

The conductive metal included in the second electrode layers 131b and 132b may be electrically connected to the first electrode layers 131a and 132a.

The conductive metal included in the second electrode layers 131b and 132b is not limited to any particular example as long as the material may be electrically connected to the electrode layers 131a and 132a, and may include nickel (Ni), copper (Cu), and palladium (Pd), silver (Ag), gold (Au), platinum (Pt), tin (Sn), tungsten (W), titanium (Ti), and alloys thereof.

The conductive metal included in the second electrode layers 131b and 132b may include at least one of spherical particles and flake particles. That is, the conductive metal may consist of only flake particles, only spherical particles, or may be a mixture of flake particles and spherical particles. Here, the spherical particle may include a shape not perfectly spherical, and may include a shape in which, for example, a length ratio between a major axis and a minor axis (long axis/short axis) may be 1.45 or less. Flake particles may refer to particles having a flat and elongated shape, and is not limited to any particular example, but, for example, a length ratio between a major axis and a minor axis (long axis/short axis) may be 1.95 or more. The lengths of the major and minor axes of spherical particles and flake particles may be obtained from images obtained by scanning cross-sections in the first and second directions in the central portion of the ceramic electronic component in the third direction using a scanning electron microscope (SEM).

The resin included in the second electrode layers 131b and 132b may secure bonding and may absorb impacts. The resin included in the second electrode layers 131b and 132b is not limited to any particular example as long as the resin may have bondability and shock absorption and may be mixed with conductive metal powder and may form a paste, and may include, for example, an epoxy resin.

Also, the second electrode layers 131b and 132b may include a plurality of metal particles, an intermetallic compound, and a resin. As the intermetallic compound is included, electrical connectivity with the first electrode layers 131a and 132a may be improved. The intermetallic compound may improve electrical connectivity by connecting a plurality of metal particles, and may surround a plurality of metal particles and may connect metal particles to each other.

In this case, the intermetallic compound may include a metal having a melting point lower than a curing temperature of resin. That is, since the intermetallic compound may include a metal having a melting point lower than a curing temperature of resin, the metal having a melting point lower than a curing temperature of resin may be melted during a drying and curing process, and may form a portion of metal particles and an intermetallic compound and may enclose the metal particles. In this case, an intermetallic compound may preferably include a metal having a low melting point of 300° C. or less.

For example, Sn having a melting point of 213 to 220° C. may be included. During the drying and curing process, Sn may be melted, and molten Sn may wet metal particles having a high melting point such as Ag, Ni, or Cu by a capillary phenomenon, and may react with a portion of Ag, Ni, or Cu metal particles, and an intermetallic compound such as $Ag_3Sn$, $Ni_3Sn_4$, $Cu_6Sn_5$, and $Cu_3Sn$ may be formed. Ag, Ni, or Cu not participating in the reaction may remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131c and 132c may improve mounting properties.

The type of the plating layers 131c and 132c is not limited to any particular example, and single-layer plating layers 131c and 132c including at least one of nickel (Ni), tin (Sn), palladium (Pd), and alloys thereof, and may include a plurality of layers.

For a more specific example of the plating layers 131c and 132c, the plating layers 131c and 132c may be Ni plating layers or Sn plating layers, and Ni plating layers and Sn plating layers may be formed in order on the electrode layers 131a, 132a, 131b, and 132b, and a Sn plating layer, a Ni plating layer, and a Sn plating layer may be formed in order. Also, the plating layers 131c and 132c may include a plurality of Ni plating layers and/or a plurality of Sn plating layers.

According to the aforementioned example embodiments, when a high voltage is applied, DC-bias properties may be improved.

Also, dielectric properties of multilayer electronic components may be improved.

Also, reliability of multilayer electronic components may be improved.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and an internal electrode; and
external electrodes disposed on the body,
wherein the dielectric layer includes a plurality of dielectric grains having a perovskite-based composition represented by $ABO_3$, the A includes a first element including at least one of Bi, Na, K, Sr, and Ca, and the B includes a second element including Ti,
wherein at least one of the plurality of dielectric grains has a core-shell structure including a core portion on an internal side and a shell portion covering at least a portion of the core portion, and a content of the first element included in the core portion is twice or more than a content of the first element included in the shell portion, and
wherein the core portion includes a first core portion on an internal side and a second core portion covering at least a portion of the first core portion, and the second core portion includes Zr.

2. The multilayer electronic component of claim 1, wherein an average content of Zr included in the at least one dielectric grain having the core-shell structure is highest in the second core portion.

3. The multilayer electronic component of claim 1, wherein Rs≤Rc is satisfied, in which Rc is ½ of an average size of the core portion and Rs is ½ of an average size of the shell portion.

4. The multilayer electronic component of claim 3, wherein 0<Rs≤Rc/2 is satisfied.

5. The multilayer electronic component of claim 1, wherein Rc2<Rc1 is satisfied, in which Rc1 is ½ of an average size of the first core portion and Rc2 is ½ of an average size of the second core portion.

6. The multilayer electronic component of claim 5, wherein Rc2 is 5 nm or more and 100 nm or less.

7. The multilayer electronic component of claim 1, wherein Rc≤Rs is satisfied, in which Rc is ½ of an average size of the core portion and Rs is ½ of an average size of the shell portion.

8. The multilayer electronic component of claim 1, wherein a central point of the at least one dielectric grain having the core-shell structure and a central point of the core portion are different.

9. The multilayer electronic component of claim 8,
wherein the at least one dielectric grain includes a grain boundary which is a boundary with adjacent dielectric grains,
wherein a linear line from a central point of the at least one dielectric grain having the core-shell structure to the grain boundary passing through a central point of the core portion is defined as L, where, with respect to the L, a linear distance from the central point of the at least one dielectric grain having the core-shell structure to a boundary point of the core portion and the shell portion is defined as D1, a linear distance from a boundary point of the core portion and the shell portion to the grain boundary is defined as D2, a linear distance from the central point of the least one dielectric grain having the core-shell structure to the central point of the core portion is defined as D3, and 0<D3 and D2<D1 is satisfied.

10. The multilayer electronic component of claim 1,
wherein the at least one dielectric grain having the core-cell structure includes a rare earth element, and
wherein an average content of the rare earth element is highest in the shell portion.

11. The multilayer electronic component of claim 10, wherein the rare earth element includes at least one of Y, Dy, Tb, Ho, Er, Gd, Ce, Nd, Sm, Tm, La, Gd, and Yb.

12. The multilayer electronic component of claim 1, wherein a content of the first element is 80 mol % or more based on 100 mol % of the A element.

13. The multilayer electronic component of claim 1, wherein a content of the second element is 80 mol % or more based on 100 mol % of the B element.

14. The multilayer electronic component of claim 1, wherein the dielectric layer includes a plurality of dielectric layers, and at least one of the plurality of dielectric layers has an average thickness of 3.0 μm or less.

15. The multilayer electronic component of claim 1, wherein the internal electrode includes a plurality of internal electrodes, and at least one of the plurality of internal electrodes has an average thickness of 1.0 μm or less.

16. The multilayer electronic component of claim 1, wherein an average size of dielectric grains having the core-shell structure is 100 nm or more and 400 nm or less.

17. A multilayer electronic component, comprising:
a body including a dielectric layer and an internal electrode; and
an external electrode disposed on the body to connect to the internal electrode,
wherein the dielectric layer includes a dielectric grain having a core-shell structure including a core portion and a shell portion covering at least a portion of the core portion,
the core portion of the dielectric grain includes Ti and an element including at least one of Bi, Na, K, Sr, and Ca,
the shell portion of the dielectric grain includes a rare earth element, and
on a linear path crossing the dielectric grain, a content of Zr has a peak in a region where a content of Ti or the element is more than the rare earth element.

18. The multilayer electronic component of claim 17, wherein the region where Zr has the peak is spaced apart from the shell portion and a center portion of the core portion.

19. The multilayer electronic component of claim 17, wherein on the linear path, a distance from a point where the content of Ti or the element is same as the content of the rare earth element to a point where Zr has the peak is 5 nm or more and 100 nm or less.

20. The multilayer electronic component of claim 17, wherein a central point of the dielectric grain and a central point of the core portion are different.

21. The multilayer electronic component of claim 17, wherein a central point of the dielectric grain and a central point of the core portion are the same.

22. The multilayer electronic component of claim 17, wherein the rare earth element includes at least one of Y, Dy, Tb, Ho, Er, Gd, Ce, Nd, Sm, Tm, La, Gd, and Yb.

23. The multilayer electronic component of claim 17, wherein an average size of the dielectric grain is 100 nm or more and 400 nm or less.

* * * * *